(12) United States Patent
Rothberg

(10) Patent No.: US 6,327,106 B1
(45) Date of Patent: *Dec. 4, 2001

(54) DISK DRIVE HAVING DATA-GUARDING FIRMWARE

(75) Inventor: Michael S. Rothberg, Foothill Ranch, CA (US)

(73) Assignee: Western Digital Technologies, Inc, Lake Forest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,805

(22) Filed: Aug. 21, 1998

(51) Int. Cl.$^7$ ....................................... G11B 5/09
(52) U.S. Cl. ............................. 360/53; 714/710
(58) Field of Search .................... 360/53, 31, 25; 714/710, 723, 769, 762; 369/58

(56) References Cited

U.S. PATENT DOCUMENTS

| 5,872,800 | * | 2/1999 | Glover et al. | 371/40.4 |
| 6,034,831 | * | 3/2000 | Dobbek et al. | 360/53 |
| 6,043,945 | * | 3/2000 | Tsuboi et al. | 360/53 |
| 6,052,804 | * | 4/2000 | Thowe et al. | 714/710 |

* cited by examiner

Primary Examiner—David Hudspeth
Assistant Examiner—Dan I. Davidson
(74) Attorney, Agent, or Firm—Milad G Shara

(57) ABSTRACT

A disk drive includes a disk defining a multiplicity of sectors. A method of operating the disk drive includes a step of providing a firmware-controlled state machine which can be in any of a plurality of states including an off-line in-progress state. While the state machine is in the off-line in progress state, the drive performs a firmware-controlled scan of the multiplicity of sectors. While performing the firmware-controlled scan, the drive identifies and repairs a marginal sector.

4 Claims, 10 Drawing Sheets

DISK DRIVE HAVING DATA-GUARDING FIRMWARE

BACKGROUND OF THE INVENTION

1. Field of the Invention

In general, this invention relates to hard disk drives having a multiplicity of sectors for storing data for operating-system and application programs. More particularly, it relates to such a drive having data-guarding firmware that controls an off-line scan to identify and repair marginal sectors.

2. Description of the Prior Art and Related Information

A huge market exists for magnetic hard disk drives for mass-market host computer systems such as servers, desktop computers, and laptop computers. To be competitive in this market, a drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative drives to meet increasingly demanding customer requirements.

These customer requirements include challenging specifications for performance (access time, data throughput, etc.) and capacity (contemporary capacity specifications are well in excess of 1 gigabyte per drive). These customer requirements also include exacting reliability and quality assurance standards which have as one of their purposes to ensure that a defect in the construction or operation of a drive does not cause loss of valuable data.

One general approach to reducing the risk of loss of data involves various ways to predict a forthcoming drive failure and providing a notice of the impending failure. An industry-sponsored committee has developed a relevant standard. This committee is referred to as the "Small Form Factor Committee." This standard is identified as the "Specification for S.M.A.R.T. SFF-8035 ver. 2.0." (S.M.A.R.T. is an acronym for Self-Monitoring, Analysis, And Reporting Technology.)

Another approach is disclosed in U.S. patent application titled "Verifying Write Operations in a Magnetic Disk Drive," Ser. No. 08/644,507, filed May 10, 1996, by Lawrence J. Barr and Anil Sareen, which is assigned to the same assignee as this application. The disclosure of this prior patent application is hereby incorporated by reference herein.

As for drives that provide for predicting an impending failure, such prior art drives can allow marginal sectors to cause adverse performance slowdowns with respect to reading data from the sectors. To provide reliability for marginal sectors, it is common to employ error correction techniques that involve multiple levels. One such level involves hardware-implemented techniques for forming "codewords"—usually Reed-Solomon codewords—that are written to the sectors, and for detecting and correcting errors on an "on-the-fly" basis (i. e., substantially simultaneously with the reading of the data from the sectors). Another such level involves firmware-controlled "heroic recovery" techniques. These firmware-controlled techniques include retries, elaborate calculations to correct burst errors that can not be corrected on the fly, and other techniques.

The execution of firmware-controlled heroic-recovery techniques can consume seconds of time, this being substantially more time than the time in the order of milliseconds normally involved in completing a read command. It is highly undesirable for an operating system or application program to wait repeatedly a few seconds each time heroic-recovery techniques are invoked.

As for drives that employ automatic verification operations as part of the overall write process, such prior art drives involve adverse performance slowdowns with respect to writing data to the sectors.

In summary of the foregoing, no prior art approach provides a comprehensive solution to meet dual goals of high reliability and fast performance—i.e., enhancing the reliability of accurate readout of data, without causing a slowdown affecting an operating-system or application program.

SUMMARY OF THE INVENTION

The invention provides a method of operating a disk drive that includes a disk defining a multiplicity of sectors. The method includes a step of providing a firmware-controlled state machine which can be in any of a plurality of states including an off-line in-progress state. While the state machine is in the off-line in progress state, the drive performs a firmware-controlled scan of the multiplicity of sectors. While performing the firmware-controlled scan, the drive identifies and repairs a marginal sector.

Preferably, the step of repairing the identified marginal sector includes a write-verify operation, and for data sectors in which the write-verify operation proves unsuccessful, the step of repairing the identified marginal sector includes a relocated operation.

Preferably, the step of identifying a marginal sector includes reading data from the sector; and testing whether the data read from the sector are within correctable limits on an on-the-fly basis.

DETAILED DESCRIPTION OF A PREFERRED EMBODIMENT

DISK DRIVE OVERVIEW

Figure 1:
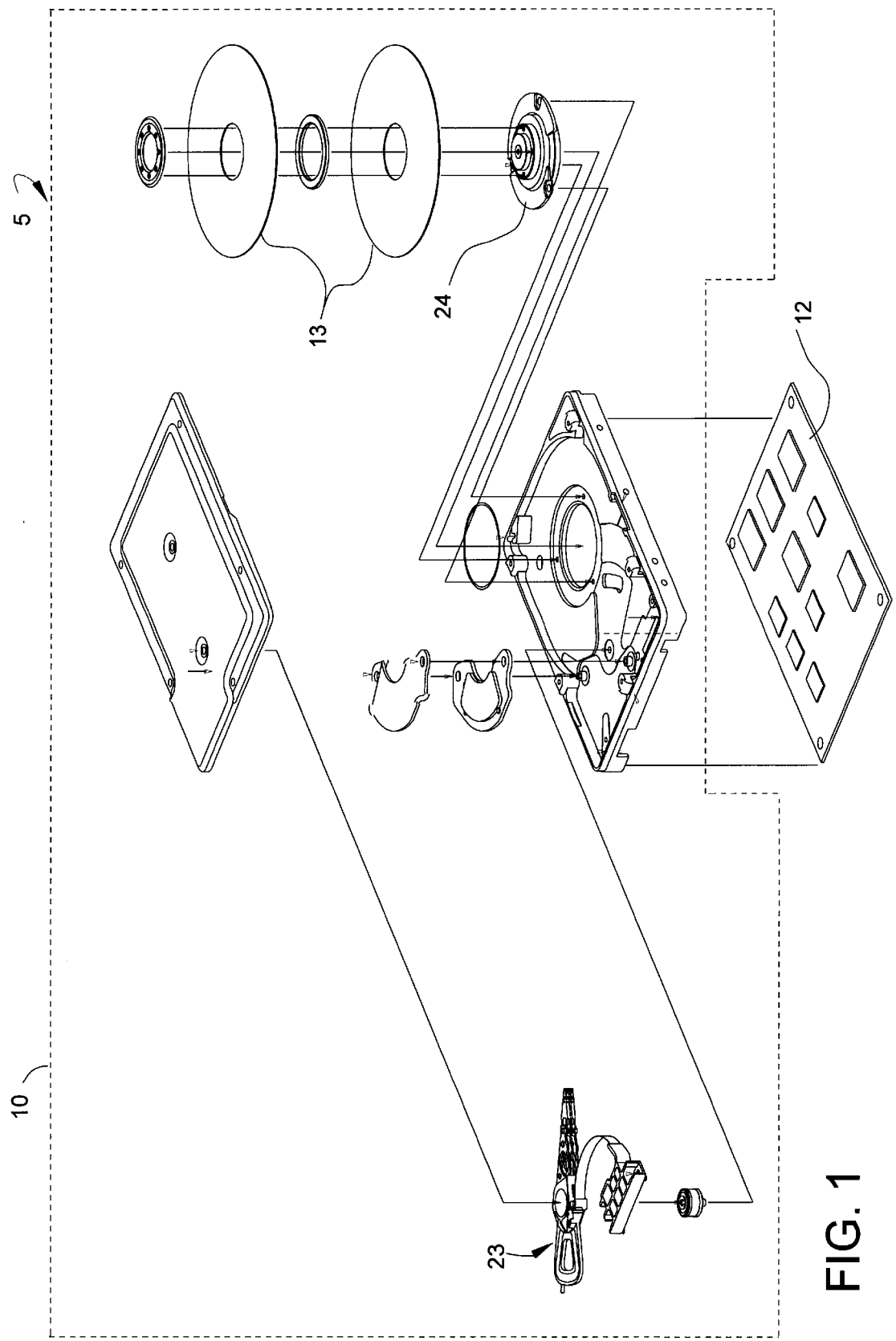
FIG. 1 is an exploded view of a magnetic hard disk drive that includes a HDA and a PCBA and that defines a suitable environment for the practice of a method in accordance with this invention.

With reference to FIG. 1, a drive 5 includes a head disk assembly (HDA 10) and a printed circuit board assembly (PCBA 12). HDA 10 suitably includes two magnetic disks 13. Each disk 13 has recording surfaces for the recording and reproduction of data transferred in connection with the execution of operating-system and application programs. The surfaces include pre-recorded embedded servo sectors used to locate and identify concentric tracks and data sectors within the tracks.

Figure 1A:
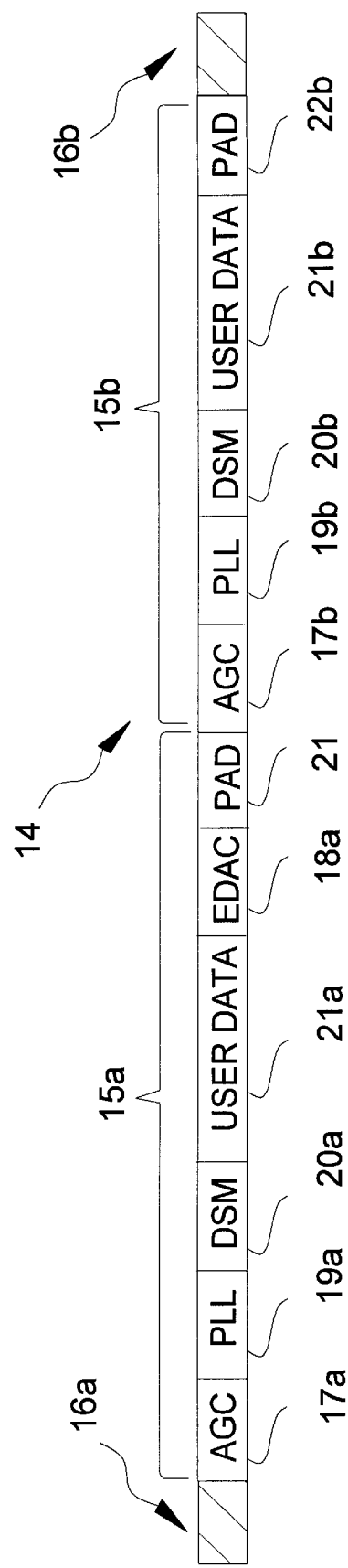
FIG. 1A is a diagram of a data track segment having a suitable format for defining multiple data sectors within a track on a recording surface of a disk in the HDA of FIG. 1.

With reference to FIG. 1A, a data track segment 14 includes the fields shown diagrammatically in a straight line. Each data track segment 14 is made up of at least one data sector generally referred to herein as data sector 15i; and suitably includes as many as 10 data sectors. The representative data track segment shown in FIG. 1 includes two such data sectors 15a and 15b. Each data track segment 14 begins at the end of a servo track segment such as servo track segment 16a, and ends at the beginning of the next servo track segment such as servo track segment 16b. Preferably, each data sector has the same format. At least one or more of the data sectors in a given data track segment 14 may be a partial data sector or a split data sector.

Each data sector suitably starts with an AGC bit stream such as AGC 17a in data sector 15a and AGC 17b in data sector 15b. Each data sector suitably includes an Error Detection And Correction code such as EDAC 18a in sector 15a. Each data sector suitably has fields storing the following elements: a data PLL bit stream ("PLL 19a" in sector 15a, "PLL 19b" in sector 15b), a data sync mark ("DSM 20a" in sector 15a, DSM "20b" in sector 15b), user-data record ("USER DATA 21a" in sector 15a, "USER DATA 21b in sector 15b), and a data pad (PAD 22a in sector 15a, "PAD 22b" in sector 15b). Alternate embodiments may include additional fields. As illustrated by data sector 15b, FIG. 3B, an EDAC field need not be included in all data sectors.

During reading, each AGC field 17a and 17b defines a constant-frequency bit stream having sufficient length to enable an AGC circuit in PCBA 12 to establish a desired signal level before the immediately following DSM 20i arrives. Each PLL 19i field defines a sequence of bits recorded at a constant frequency which has a sufficient number of consecutive flux reversals to enable timing circuitry in PCBA 12 to achieve phase synchronization before the immediately following DSM arrives.

Each DSM participates in framing user data to locate the first bit in its user-data record 21 and to establish byte boundaries for an ENcoding And DECoding circuit ("ENDEC") circuit in PCBA 12.

Most user-data records 21 store a fixed sized quantity of data called a "logical sector" or "logical block" as supplied during execution of operating and application programs. Typical logical block sizes are 512, 1024 or 2048 bytes with 512 bytes being the preferred length for most hard disk drives.

Each EDAC field is used by error detection and correction means to correct errors in user data recovered from user-data records while the user data are stored in a data buffer. Error detection and correction means are provided as described below.

With reference again to FIG. 1, HDA 10 also includes a head stack assembly 23 that includes heads and a supporting and movable structure for radially moving each head across the recording surface adjacent the head, and includes a spindle motor 24 for rotating the disks. PCBA 12 is connected to HDA 10 and includes electronic circuits used to control disk drive 5.

PCBA BLOCK DIAGRAM DESCRIPTION

Figure 2:
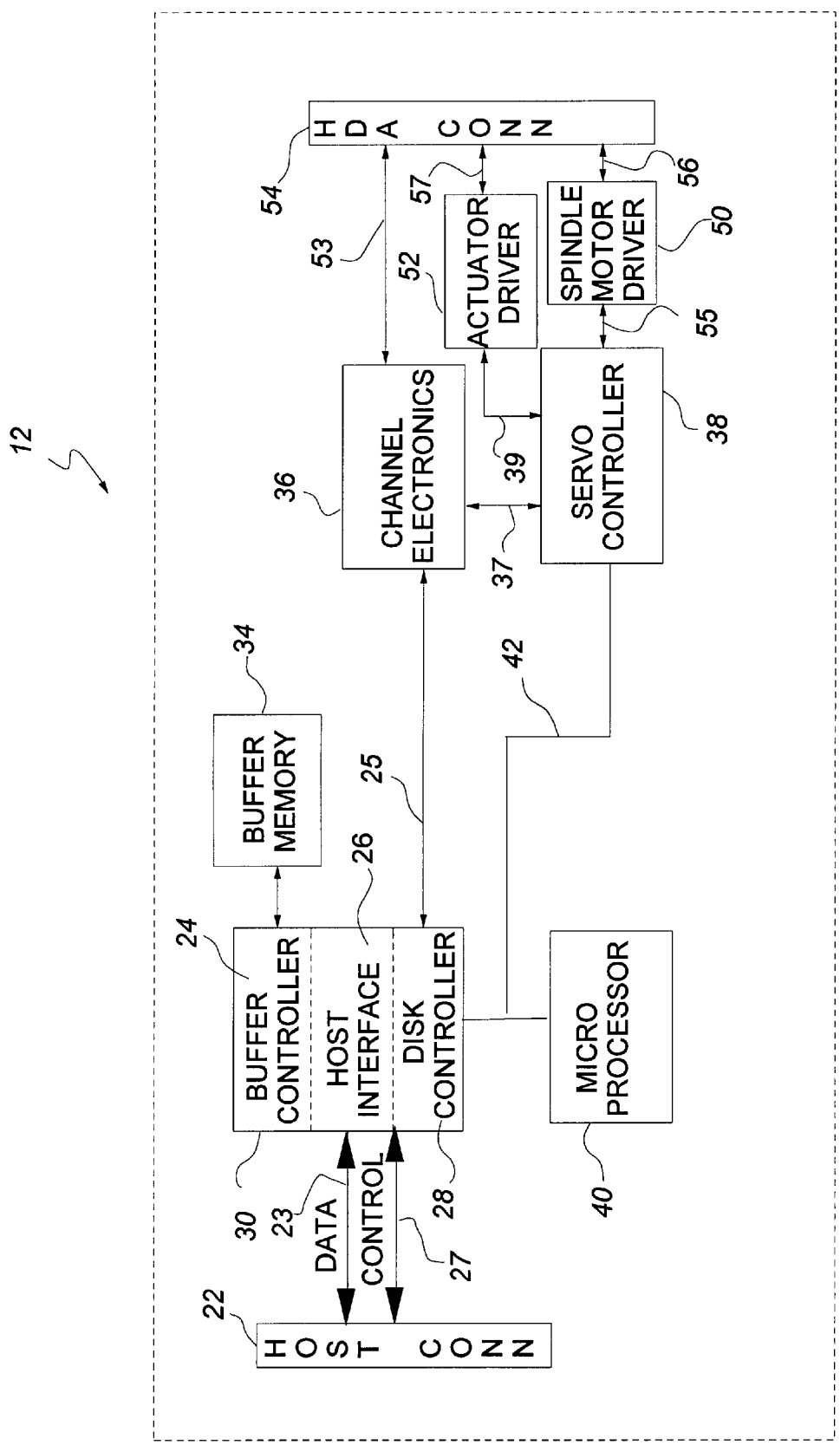
FIG. 2 is a block diagram of the PCBA of FIG. 1.

With reference to FIG. 2, PCBA 12 includes a host connector 22, an integrated circuit controller 30, a buffer memory 34, channel electronics 36, a servo controller 38, a microprocessor 40, a spindle motor driver 50, an actuator driver 52, an HDA connector 54, and various signal paths. The signal paths include a data signal path 23 and control signal path 27 defined between host connector 22 and integrated circuit controller 30; a signal path 25 defined between integrated circuit controller 30 and channel electronics 36; a signal path 37 defined between channel electronics 36 and servo controller 38; a signal path 39 defined between servo controller 38 and actuator driver 52; a signal path 57 defined between actuator driver 52 and HDA connector 54; a signal path 55 defined between servo controller 38 and spindle motor driver 50; a signal path 56 defined between spindle motor driver and HDA connector 54; a signal path 53 defined between channel electronics 36 and HDA connector 54; and a bus 42 defined between microprocessor 40 and both controller 30 and servo controller 38.

Host connector 22 provides for electrically connecting drive 5 to the host computer (not shown), and HDA connector 54 electrically connects PCBA 12 to HDA 10. Integrated circuit controller 30 includes three functional blocks: a buffer controller 24, a host interface controller 26, and a disk controller 28.

Buffer controller 24 is connected to buffer memory 34, which may be implemented as a static random access memory (SRAM) or dynamic RAM (DRAM) in various forms including fast-page mode, extended data out (EDO) or the like. Buffer memory 34 may be a single device; an array of devices; or in an alternate embodiment, a memory cell array integrated within the buffer controller. Buffer controller 24 operates to provide a data path and control signals for reading and writing data in the buffer memory 34. Data stored in buffer memory 34 may be received from the host computer during a host write operation, or may be received from the disk 13 during a disk read operation.

Host interface controller 26 provides a path and logic for data and control signals associated with a host bus (not shown), attached to the host computer. Host interface controller 26 also performs command decoding and status presentation functions. In the preferred embodiment, the host bus is implemented as the ATA attachment prevalent in the personal computer industry. Other useful implementations include the SCSI bus and the SSA serial bus architecture. Host interface controller 26 communicates with microprocessor 40 to signal the receipt of host commands, and transfers data between the host bus and buffer memory 34 in cooperation with buffer controller 24.

Disk controller 28 provides control logic for encoding and decoding data written to and read from the disk media. The data read from the disk includes position information such as track and sector identification fields, as well as user data. Disk controller 28 also includes error detection code (EDC) and error correction code (ECC) logic, shown in FIG. 3 and later discussed, which provides means for calculating and appending redundancy codes to each block of data written to the disk and for detecting and correcting errors in the recorded block during read operations.

Microprocessor 40 commands disk controller 28 to perform operations through bus 42. Commands and parameters for disk read and write operations are loaded into registers used during command execution.

Microprocessor 40 suitably is a conventional stored program processor such as the Intel 80C196 that executes code from program memory (not shown). Program memory may be integrated within the microprocessor or implemented in an external read-only memory (ROM) or programmable read-only memory (PROM). The stored program executed by microprocessor 40 manages the resources represented by the controller components and the HDA to optimize performance and data transfer integrity within the disk drive. In particular, the method of the subject invention is practiced by the execution of a stored program. Although in the preferred embodiment a single microprocessor is shown, alternate embodiments may implement additional microprocessors such as needed for managing the servo control functions. This invention may be practiced with equal advantage in such alternative embodiments.

Servo controller 38 is connected to microprocessor 40 through bus 42 for command, data transfer and priority interrupt functions. Servo Controller 38 is connected to channel electronics 36 for receiving servo burst and ID field information when embedded servo fields, written on the media during the manufacturing process, are moving under the disk read heads. During disk seek operations when actuator assembly 23 of HDA 10 operates to reposition the read/write heads to a particular track on the disk media, servo controller 38 accepts seek parameters from microprocessor 40 and provides actuator driving signals on a control path through actuator driver 52 and HDA connector 54. Microprocessor 40 confirms completion of the seek operation by reading track identification data recorded in the embedded servo fields. Once the read/write heads are positioned on the specified track, microprocessor 40 with servo controller 38 maintains the heads in position over the track by reading servo burst information recorded on the media, received through channel electronics 36, and responsively applying small increments of correction to the actuator position through the above-mentioned control path.

Servo controller 38 also contains control logic to drive disk spindle motor 24 at a precise revolution rate through spindle motor driver 50 and HDA connector 54. The precise rotation speed of the disk media enables channel electronics 36 to write and read data within predictable dynamic ranges.

Channel electronics 36 includes circuits which, in write operations, transform encoded digital data into analog signals for driving the head to write magnetic flux transitions onto the disk media. During read operations, circuits in channel electronics 36 reverse this process, transforming magnetic flux transitions detected by the head from the media surface into decoded digital data. Channel electronics 36 is connected to the read/write heads through internal head selection logic via HDA connector 54.

ON-THE-FLY ECC

An important part of the environment in which this invention is suitably practiced is structure for performing ECC on an on-the-fly basis and structure associated with more time-consuming error recovery procedures.

As for on-the-fly ECC, a data stream or block of data to be written on the disk is passed through an error correction code generator that produces a set of check codes that are appended to the data block written on the disk. The concatentation of the data block and the check codes form a "codeword." During a read operation, error detection code logic produces a set of "syndromes" which represent the result of a process which is complementary to the code generation process. Non-zero syndromes indicate an error in the data, and the syndromes provide information which is useful in determining the location and magnitude of the error.

A type of error correction termed "on-the-fly" error correction provides methods and apparatus which enable rapid error correction processing without interrupting the microprocessor.

Typically, error correction performed on-the-fly is limited in the extent or "span" of errors which can be corrected compared to the more extensive processing which could be performed after interruption of the disk drive microprocessor. Additionally a miscorrection in the process is a possibility.

Figure 3:
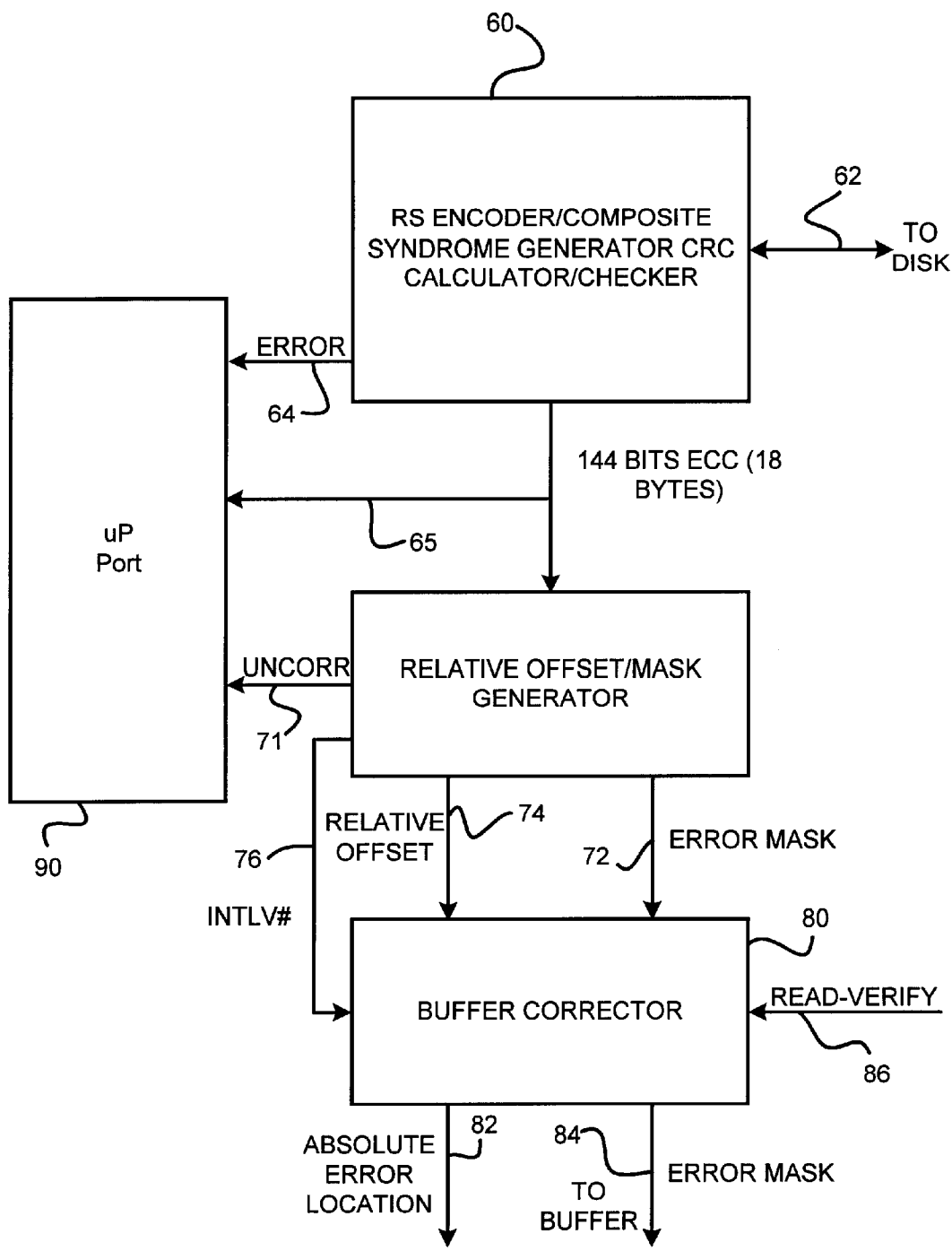
FIG. 3 is a block diagram of an error detection and correction structure in the PCBA of FIG. 1.

With reference to FIG. 3 structure which is suitably incorporated into disk controller 28 includes a Reed-Solomon (RS) Encoder/Syndrome Generator/CRC calculator checker 60 which generates a sequence of 4 error detection code bytes, called a Cyclic Redundancy Check (CRC). The CRC bytes are appended to the user data block when written to the disk through line 62. The data block of 512 bytes and the concatenated 4 CRC bytes are passed through a Reed-Solomon encoding process which provides a set of 18 ECC bytes which are appended the data block and CRC during the write operation to form a complete codeword of 512+4+18=534 bytes.

RS Encoder 60 also provides for an interleaving of the error correction code generation such that three interleaves representing respective thirds of the data block, each having corresponding 6 byte ECC (18 ECC bytes total), are processed. This allows for a correction span of one byte in each interleave during read operations which significantly improves data recovery over a single byte error correction path.

During a read operation, a codeword—comprising sequentially data, CRC, and ECC—is read from the disk on line 62 and passed through a composite syndrome generator and CRC calculator/checker in RS Encoder 60. If the result of the CRC check indicates an error to that point in the codeword, error line 64 is asserted and may be read by microprocessor 40 through uP port 90. The remainder of the codeword, comprising the ECC bytes, is passed through the composite syndrome generator in RS Encoder 60 to form a set of 18 syndrome bytes. If the syndrome generation results in any non-zero syndrome bytes, an error is indicated through error line 64.

The detection of CRC errors provides an additional safeguard against miscorrections since the error control logic can validate the ECC syndrome generation by comparing the results of the CRC check against the syndrome generation. When there is both a CRC error and a non-zero syndrome, the likelihood of miscorrection is greatly reduced.

When an error is indicated, the syndrome bytes 65 are provided to Relative Offset/Mask Generator 70. When enabled, the logic in block 70 computes a buffer offset address 74 and error mask 72 from the syndrome bytes and provides the offset address 74, error mask 72 and interleave number 76 to Buffer Corrector 80. Buffer Corrector 80 then calculates an absolute buffer memory address 82 and corrects the data in buffer memory 34 through buffer controller 24 using error mask 84.

Because the entire correction process only requires the stored syndrome bytes and because the process can be completed before the next consecutive codeword is processed, the requirements of on-the-fly error correction are satisfied.

As for more time-consuming error recovery procedures, in some cases, when syndrome bytes 65 are processed by Relative Offset/Mask Generator 70, the errors in the recovered codeword may exceed the error correction span of the logic i.e. one byte per interleave. In this case, the correction of data in the buffer memory is suppressed and the Uncorrectable signal line 71 is asserted. The state of this signal may be read by microprocessor 40 through uP port 90. Microprocessor 40 may elect to attempt extended recovery of the data when Uncorrectable line 71 is asserted. Under these circumstances the transfer of data from the disk is terminated and microprocessor 40 reads the syndrome bytes 65 through uP port 90 for use in extended error correction.

STATE MACHINE

Drive 5 implements a firmware state machine having conventional and innovative features. The basic component elements of the state machine are conventional in terms of including a microprocessor (e.g., 40), by associated memory for storing instructions for its firmware control, and by memory for storing and retrieving intermediate results including data defining the current state of the state machine.

Suitably, one aspect of the state machine is its support for the S.M.A.R.T. protocol. Among other things, the state machine provides supervisory control over an off-line data collection process initiated by an Off-line Immediate command. Another, innovative off-line data collection process is initiated automatically.

As for Off-line Immediate, it is initiated by the host involving the SMART EXECUTE OFF-LINE IMMEDIATE command. Off-line data collection then proceeds autonomously until data collection is completed or suspended or aborted. If aborted, a new SMART EXECUTE OFF-LINE IMMEDIATE command is required to restart data collection. If suspended by one of the "suspend" commands, except a STANDBY IMMEDIATE command, off-line immediate data collection will resume where it left off within 5 seconds of servicing the last interrupting command. If suspended by a STANDBY IMMEDIATE command, data collection will resume where it left off within 5 seconds of servicing the last command in the set that brought the drive out of standby.

If drive 5 is turned off while performing off-line immediate, data collection will resume after 4 minutes of idle time after power-up.

As for Automatic Off-line, it is initiated by a set of three timers: Power-on Timer, Idle Timer and Standby Timer. Power-on Timer accumulates the number of minutes the drive is on, either active, idle, standby or sleep. This timer stops counting when drive 5 is powered off. When this timer has reached its threshold (which is set in increments of ten minutes and is suitably set initially to a value corresponding to 8 hours), an off-line data collection is said to be "pending". When an off-line data collection (either automatic or immediate) completes, the Power-on Timer is set to zero and the pending condition is cleared. The Power-on Timer is non-volatile and retains its value across power cycles.

The other two timers—Idle and Standby—both accumulate the number of seconds of power-on time since drive 5 has received a command from the host. Both have corresponding thresholds. The Idle threshold is preset to a value corresponding to 15 seconds; whereas, the Standby is initially set to zero—which means disabled. However, the Standby Threshold may be set by the host for idle periods of 5 seconds to 20 minutes, in units of 5 seconds (some products have a minimum threshold of 10 minutes). The first one of these two timers to exceed their threshold while an off-line data collection is pending, will cause an automatic data collection to begin. If the Standby Timer caused off-line data collection to begin, then the drive will enter standby mode when done collecting data. If the Standby Timer exceeds its threshold and off-line data collection is not pending, then the drive will enter standby mode at once. If the Idle Timer exceeds its threshold before the Power-on Timer exceeds its threshold (a normal occurrence), the Idle Timer will continue to count until either the power-on Timer reaches threshold or some host activity causes the Idle Timer to be reset. Note, if the Power-on timer exceeds threshold while the drive is in standby or sleep, the drive while not start an Off-line scan until a command from the host the drive out of the power save mode and then the Idle Timer has a chance to exceed threshold.

Once off-line data collection has begun via timer, it proceeds autonomously until data collection is completed or suspended or aborted. If aborted, the Power-on Timer is not reset. Once either the Idle or Standby Timers reach threshold, data collection will restart from the beginning. If suspended by one of the "suspend" commands, except a STANDBY IMMEDIATE command, automatic off-line data collection will no longer be pending, but will become pending again after 15 minutes of power-on time. Once the off-line becomes pending again, the drive must experience 15 seconds of uninterrupted idle time before resuming off-line data collection. When the off-line scan does resume, it will be at the point of suspension; it does not restart from the beginning. If suspended by a STANDBY IMMEDIATE or SLEEP command, drive 5 will behave the same as being suspended by any other "suspend" command but will not start counting the 15 seconds of idle time until the drive receives a command causing it to spin-up.

If drive 5 is turned off while an automatic off-line is pending or the drive is in the middle of performing an automatic off-line, the off-line data collection with resume after the 15 seconds of uninterrupted idle time after the drive is power-up.

Figure 4:
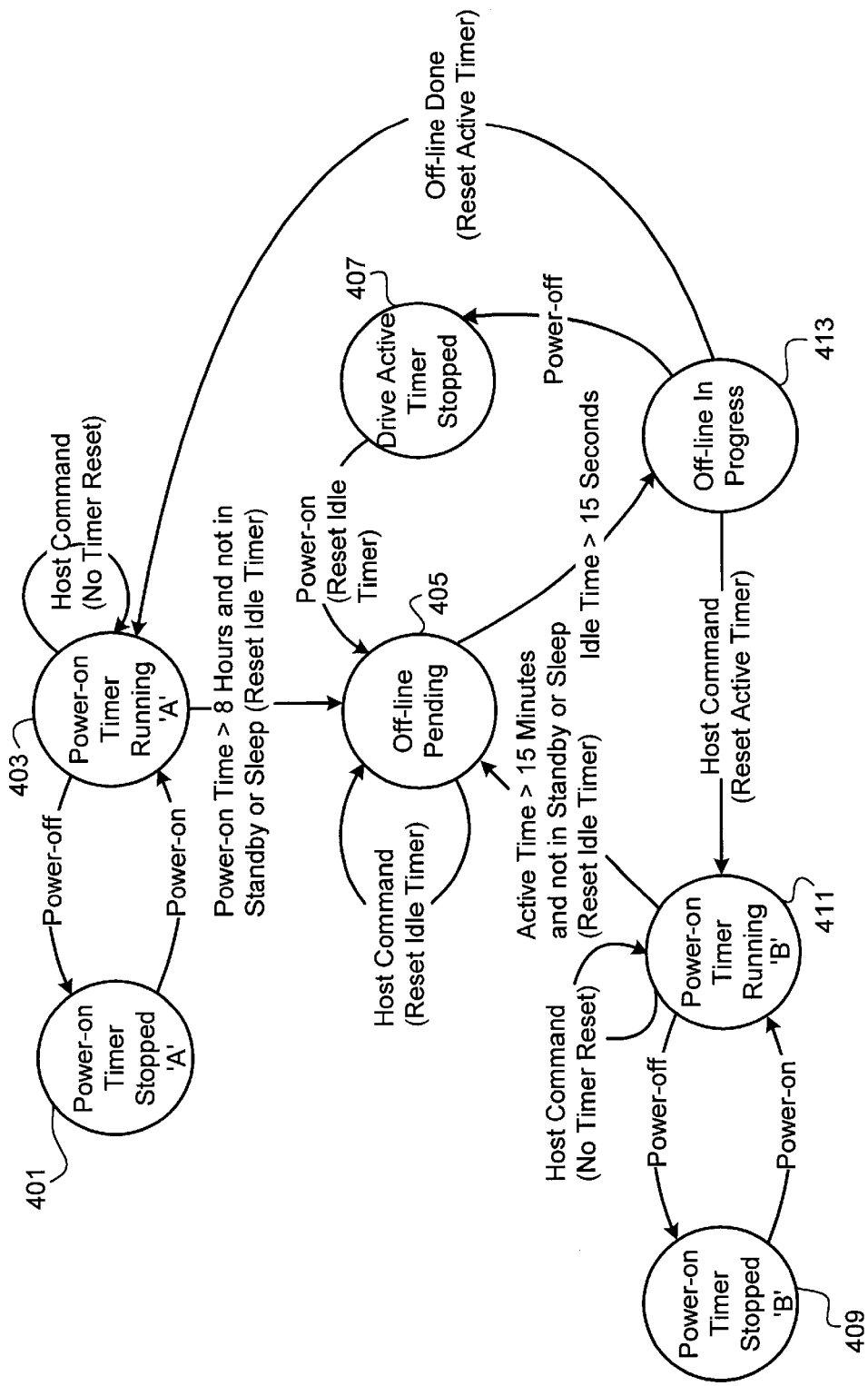
FIG. 4 is state diagram for a firmware-controlled state machine provided in the drive of FIG. 1.

With reference to FIG. 4, there will now be described the relevant states of the state diagram for a firmware-controlled state machine which can be in any of a plurality of states including an off-line in-progress state; the operation of the timers that start an Automatic Off-line scan are illustrated therein.

Suitably, the state machine defines the following states: a state 401 for "power-on timer stopped 'A'"; a state 403 for "power-on timer running 'A'"; a state 405 for "off-line pending"; a state 407 for "drive active timer stopped"; a state 409 for "power-on timer stopped 'B'"; a state 411 for power on timer running 'B'"; and a state 413 for "off-line in progress." Upon initialization of drive 5, state 403 is entered forthwith after power is applied, and a relatively long duration delay is counted out; suitably this delay lasts a total of eight hours. The occurrence of a host command does not reset this counter. Each time power is removed and then reapplied, the state machine cycles through state 401 back to state 403.

After the total elapsed time of operation with power on (and not in Standby or Sleep), the state machine exits state 403 and enters state 405, the state for which an off-line scan is said to be "pending." A host command arriving during state 405 does not change the state of the state machine to any of the other relevant states, resets the idle timer. Other ways to enter state 405 are via exit from state 407 and from state 411. Exit from state 405 results in entry into state 413; this occurs after 15 seconds have elapsed in the Off-line pending state as measured by the Idle timer.

As for exiting state 413 this occurs: when a host command is received, resulting in entry into state 411; when power off occurs, resulting in entry into state 407; and when off-line is done, resulting in entry into state 403.

OFF-LINE IN PROGRESS—OVERALL FLOW

Figure 5:
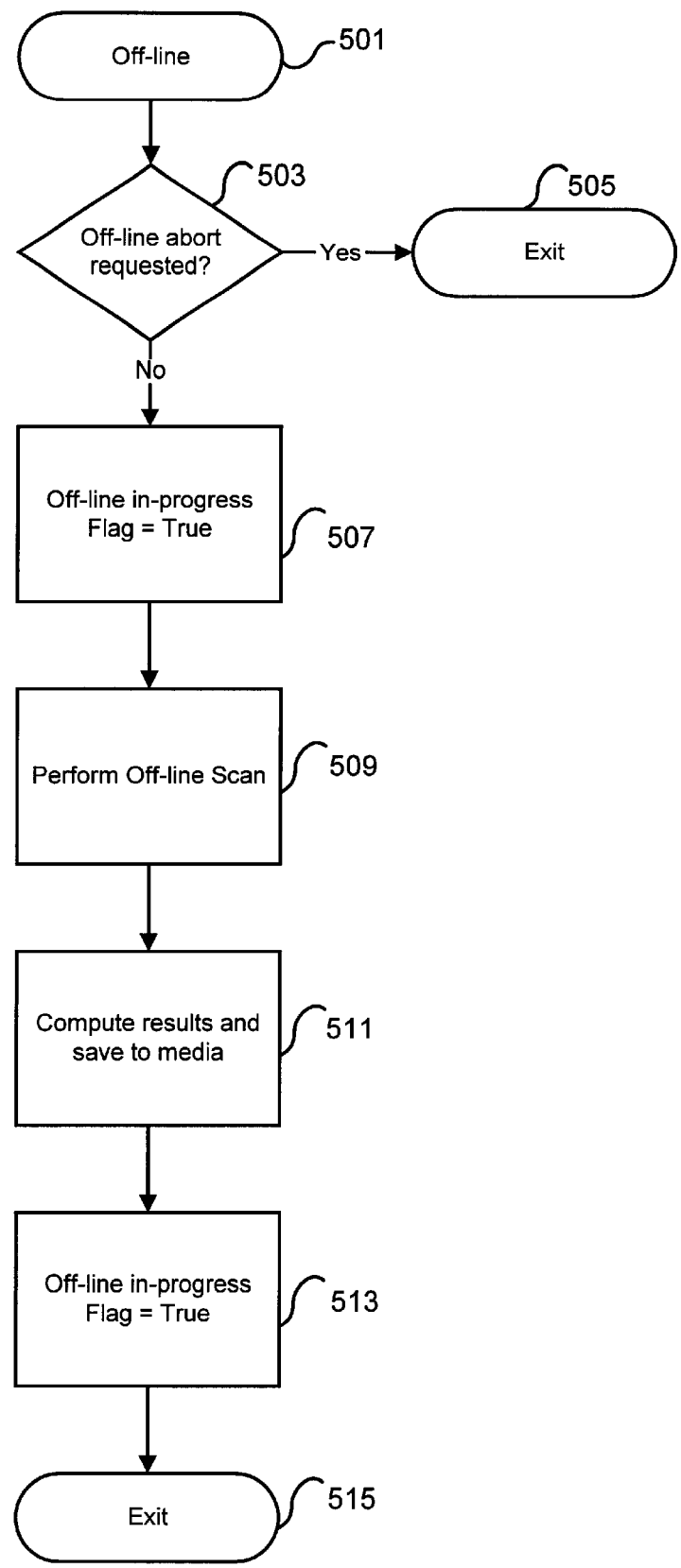
FIG. 5 is a flow chart showing the overall flow of operations from entry into and exit from the Off-line In Progress state of FIG. 4.

With reference to FIG. 5, a flow of operations that occur during state 413 of FIG. 4 initiates at 501. Forthwith after entry into state 413, a test is effected at a step 503 to determine whether an off-line abort has been requested; if so, the flow exits through step 505 to cause the state to change to state 407 or state 411. Otherwise, the flow proceeds to step 507 in which an Off-line in progress flag is set to true. Next, in step 509, there are performed a sequence of operations collectively referred to as "perform off-line scan." Next, in step 511, there are performed a sequence of operations collectively referred to as "compute result and save to media." Next, in step 513, there off-line in progress flag is set to "false." Next, the flow exits through step 515 to cause the state to change to state 403.

OFF-LINE SCAN

Figure 6:
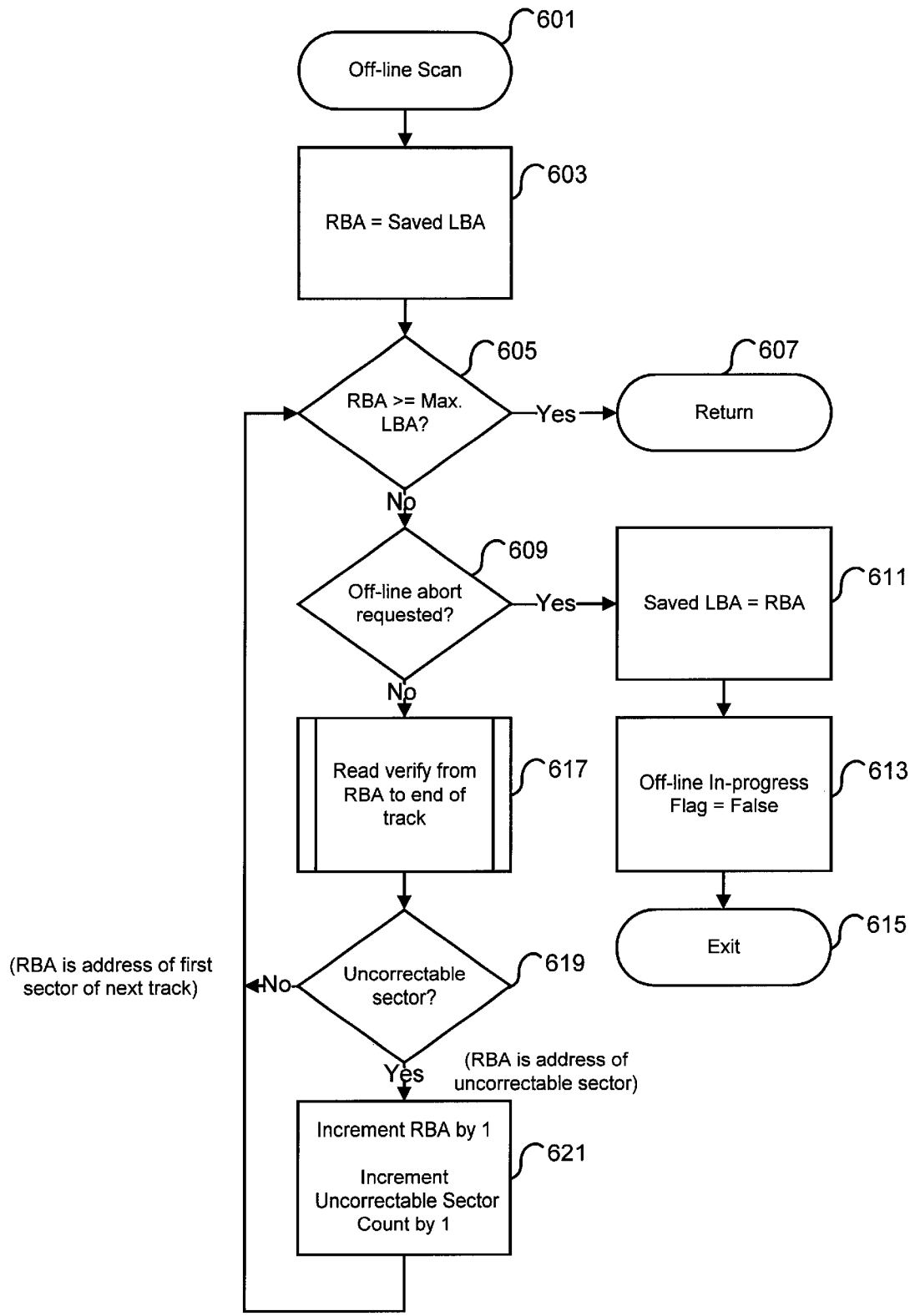
FIG. 6 is a flow chart showing the overall flow of operations in performing the Off-line scan step of FIG. 5.

With reference to FIG. 6, a flow of operations that occur upon invocation and return from a called procedure referred to as off-line scan initiate at 601. Forthwith upon being called, this procedure sets a variable "RBA" (an acronym for "Requested Block Address") to the value of a variable "Saved LBA" (an acronym for "Saved Logical Block Address") Next, in a step 605 a test is effected to determine whether the RBA variable is equal to or greater than a drive parameter referred to as "Max LBA" (an acronym for Maximum LBA); if so, the flow proceeds to step 607 to return to the calling procedure. Otherwise, the flow proceeds to a step 609. In step 609 a test is effected to determine whether a request has been received to abort the off-line scan; if so, the flow proceeds to steps 611, 613, and 615. In step 611, the variable Saved RBA is set to RBA so that the currently requested RBA can be retrieved upon a subsequent call of the off-line scan procedure. In step 613, the Off-line In-progress flag is set to false. In step 615, the procedure exits so that the state machine can change states to state 411.

If the test of step 609 indicates no request to abort, the flow proceeds to step 617. In step 617, a read-verify operation is performed for the data from the currently requested RBA to the end of the track. Next, in step 619, a test is effected to determine whether the immediately preceding read-verify operation met with an uncorrectable sector; if so, the flow proceeds to step 621. In step 621, the variable RBA is incremented by 1 a variable that keeps track of the number of identified Uncorrectable sectors is incremented by 1. Then the flow loops back to step 605 for another test to determine whether to return or proceed through another cycle.

otherwise it loops back to

READ VERIFY COMMAND

Figure 7:
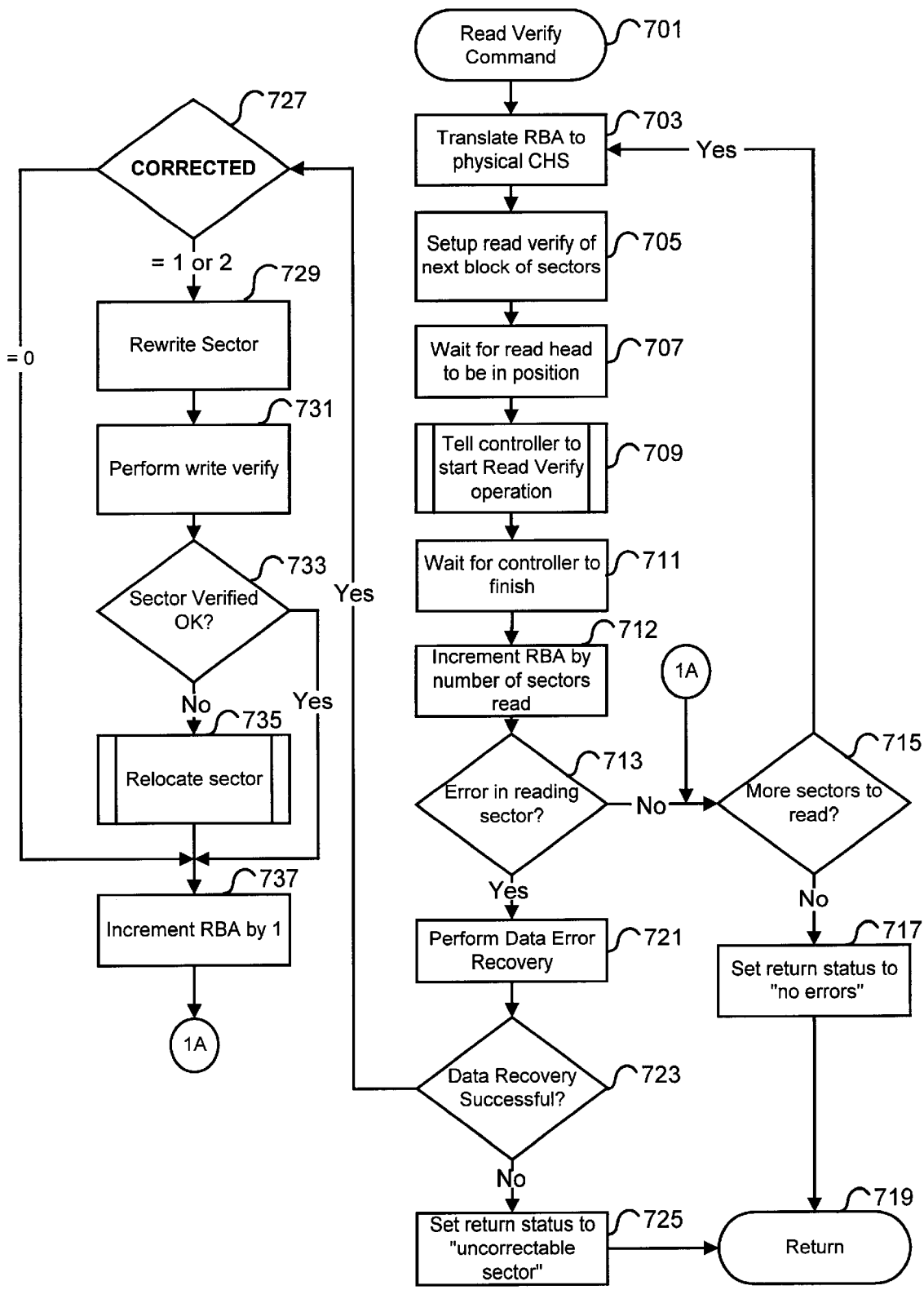
FIG. 7 is a flow chart showing the overall flow of operations in performing the Read Verify Command step of FIG. 6.

With reference to FIG. 7, a flow of operations that occur during the read verify command referred to at steps 617 of FIG. 6 initiate at 701. Forthwith after invocation of this command, the flow proceeds to step 703 at which the current RBA is translated to a physical cylinder head sector address ("CHS"). Next, at step 705, the flow involves setting up the next block of sectors to be subjected to the read verify operation. Next, at step 707, there is a delay to wait for the read head to be in position to read out the desired data. Next, at step 709, the microprocessor commands the controller to start the read verify operation. Next, at step 711, the microprocessor waits for the controller to finish its task in performing the read verify operation. Next, at step 712, the RBA is incremented by the number of sectors read.

Next, at step 713, a test is effected to determine whether an error occurred in reading a sector during the immediately preceding steps; if not, the flow proceeds to step 715. At step 715 a test is effected to determine whether there are more sectors to read; if so, the flow returns to block 703 for another cycle through the loop which includes steps 703 through 715. If the test reveals there are no more sectors to read, the flow proceeds to step 717. In step 717, the return status is set to "no errors." Next, at step 719, there is a return to the calling procedure.

If the test effected in step 713 indicates that an error occurred in reading a sector, the flow proceeds to step 721 at which a series of steps are performed to recover from the data error. Next, at step 723, a test is effected to determine whether the data recovery steps proved successful; if not, the flow proceeds to step 725 at which the return status is set to "uncorrectable sector." After step 725, the flow proceeds to the return step (719).

If the test effected in step 723 indicates that data recovery has been successful, the flow proceeds to step 727. In step 727, a test is effected to determine whether a recovery variable has been set to 0 or to one of two values, namely, 1 or 2. If the recovery variable is 1 or 2, the flow proceeds to step 729 at which the sector is rewritten. Next, according to a distinguishing and advantageous feature of this invention, at step 731, a write verify operation is performed. Next, at step 733, a test is effected to determine whether the write verify operation resulted in the sector being verified OK. If not, the flow proceeds to step 735, at which the sector is relocated (i.e., the data is written to another sector and the appropriate tables are updated for future addressing purposes). After step 735, and also after step 733 (if the sector verified as OK) the flow proceeds to step 737 at which the RBA is incremented by 1. After step 737, the flow proceeds to step 715 to determine again whether there are more sectors to read.

DATA ERROR RECOVERY FLOW

Figure 8:
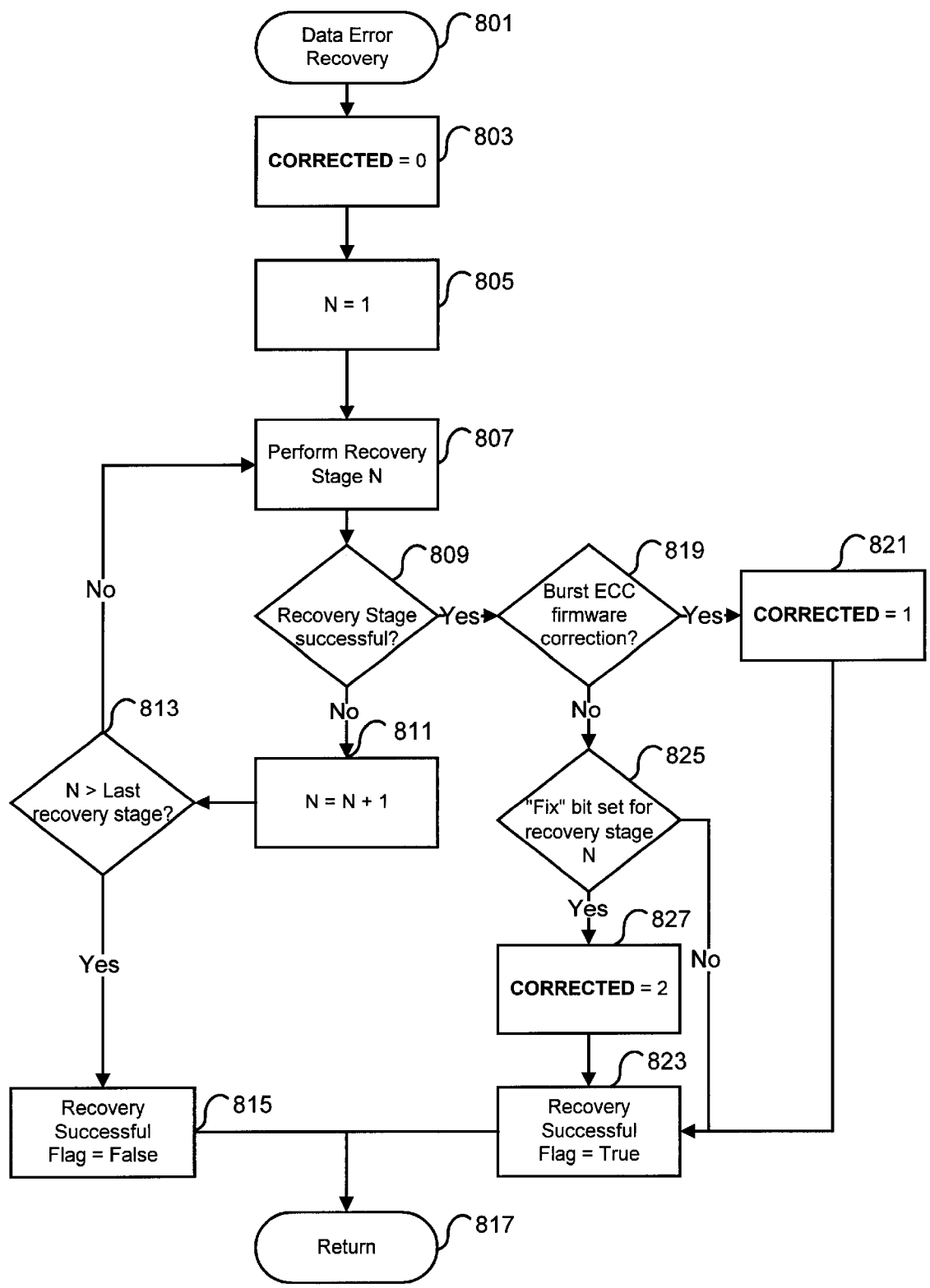
FIG. 8 is a flow chart showing the overall flow of operations in performing the Data Error Recovery step of FIG. 7.

With reference to FIG. 8, a flow of operations that occur during data error recovery step 721 of FIG. 7 initiate at 801. Forthwith, upon performing these operations, a recovery variable ("CORRECTED") is set to 0. Next, at step 805, a stage variable ("N") is set to 1. Next, at step 807, the flow involves performing recovery for stage N, which the first time through the loop is stage N=1. Next, the flow proceeds to step 809, at which a test is effected to determine whether the recovery stage was successful. If not, the flow proceeds to step 811 at which the variable N is incremented by 1. Next, the flow proceeds to step 813, at which a test is effected to determine whether the value of N has exceeded the last recovery stage. If not, the flow proceeds to loop back to step 807 to perform recovery for the new next stage. If the test effected in step 813 reveals that the value of the variable N exceeds the last recovery stage, then the flow proceeds to step 815. At step 815, a flag for indicating whether recovery has been successful is set to "False." After step 815, the flow proceeds to step 817 to return to the calling procedure.

If in step 809 the test reveals that the recovery stage has been successful, the flow proceeds to step 819 at which a test is effected to determine whether a burst ECC firmware procedure had been the basis for effecting the correction. If so, the flow proceeds to step 821 at which the value of the recovery variable ("CORRECTED") is set to 1. After step 821, the flow proceeds to step 823 at which the recovery successful flag is set to "True." Next, the flow returns through step 817.

If the test effected in step 819 reveals a different basis for correction, the flow proceeds to step 825. At step 825, a test is effected to determine whether a "Fix" bit has been set for recovery stage N. If not, the flow proceeds to step 823 which has been described above. If so, the flow proceeds to step 827, at which the recovery variable "CORRECTED" is set to 2. Then, the flow proceeds to step 823 which has been described above.

DATA ERROR RECOVERY STAGES

Figure 9:
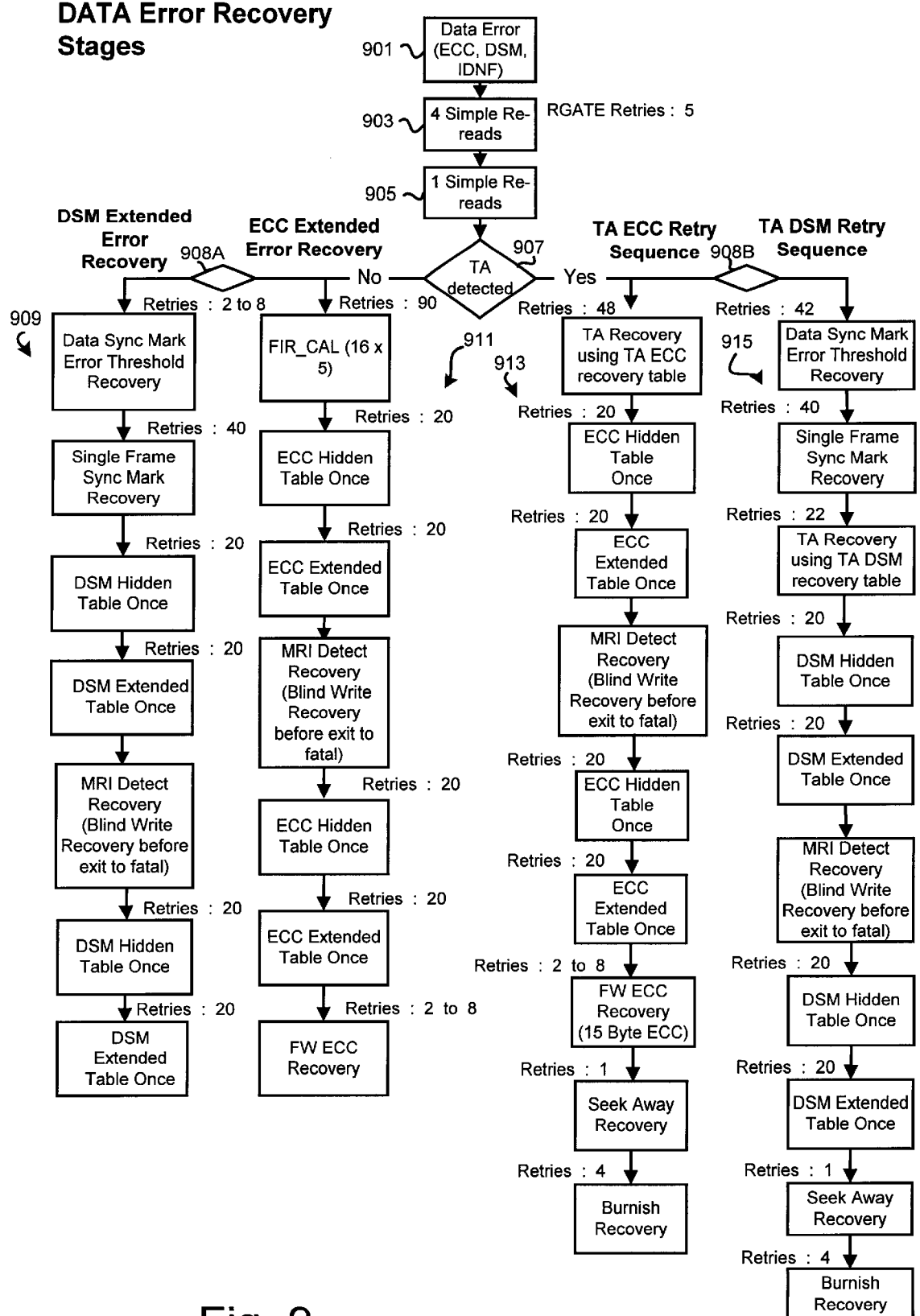
FIG. 9 is a flow chart of the Data Error Recovery Stages referred to in FIG. 8.

With reference to FIG. 9, there will now be described a flow of operations that are performed in step 807 of FIG. 8. The overall purpose of the multitude of possible steps depicted in FIG. 9 (many of which involve retries) is to recover the correct data from a marginal sector that has been read with the result that the read data does not constitute a codeword and can not be corrected on an on-the-fly basis to form a codeword. If any of the various retries (sometimes referred to as simple re-reads) proves successful in recovering correct data, the flow returns to proceed to step 809 (FIG. 8).

At 901 disk controller 28 (FIG. 2) sets a register to indicate whether a data error falls into an ECC category, a DSM category, or an IDNF category. The ECC category is a general category for read data that do not form a codeword. The DSM category is for data errors involving a failure to detect the Data Sync Mark (see DSM 20*a* and 20*b* in FIG. 1A). The IDNF category is for data errors called "ID Not Found." In the context of a headerless-format drive, IDNF relates to data that does not constitute a codeword because of an LBA issue. (In this regard, see U.S. Pat. No. 5,640,286 issued Jun. 17, 1997, titled "DISK DRIVE WITH ERROR CODE EMBEDDED SECTOR IDENTIFICATION.") At a step 903, up to 4 Simple Re-reads are performed. If (and as soon as) one of these simple re-reads proves successful, the flow returns to proceed to step 809 of FIG. 8. At a step 905, another Simple Re-read is performed. If this simple re-read proves successful, the flow returns to proceed to step 809 of FIG. 8; otherwise a flag is set to indicate whether a thermal asperity ("TA") has been detected. At a step 907, a test is effected to determine whether the TA) flag has been set. If not, the flow proceeds to a flow of a step 908A and from there to step generally indicated at 909 or to steps generally indicated at 911. If yes, the flow proceeds to a step 908B and from there to steps generally indicated at 913 or to steps generally indicated at 915.

At step 908A, a test is effected to determine whether to perform DSM extended error recovery or to perform ECC extended error recovery. The steps generally indicated at 909 constitute the steps for DSM recovery and the steps indicated at 911 constitute the steps for ECC recovery.

As for DSM recovery, this can be a very extensive process involving many retries. The maximum number of retries suitably provided is set forth next to each functional block in FIG. 9. At any point that one of the retries proves successful, the flow returns to step 809. With respect to a first set of retries, each of these involves setting the threshold for detecting the DSM to a predetermined one of a set of thresholds. In this regard, see U.S. patent application Ser. No. 08/815,352, filed Mar. 11, 1997, titled "DISK DRIVE EMPLOYING READ ERROR TOLERANT SYNC MARK DETECTION" (the "Cloke application"—Attorney Docket No. K35A0195), the disclosure of which is hereby incorporated by reference herein.

With respect to a single frame sync mark recovery, this involves selecting a different one of two data sync marks (see the Cloke application). Another set of retries involves varying the parameters involved in the read channel (see the Cloke application). Up to 20 retries are involved using one set of read-channel parameters and up to 20 more are involved for a second such set. As for MRI, this is an acronym for MagnetoResistive head Instability. MRI involves the head entering an undesirable state. A recovery procedure that is the invention of another employee of the assignee is suitably invoked to attempt to first reset the head to its normal state, and then effecting another set of retries using the varying parameters for the read channel.

With respect to the sequence of step 911 for ECC extended error recovery, this is generally similar to step 909; however, it starts with a set of up to 90 retries involving changes to the Finite Impulse Response (FIR) filter in the read channel.

With respect to TA ECC and TA DSM recovery, the sequences 913 and 915 are similar to those described above for 911 and 913; however, these sequences can involve "seek away" recovery and "burnish" recovery. Seek away involves an effort to move away from the target track and then seek back and then retry in an effort to dislodge a particle or the like that may be the source of the TA. Burnish involves multiple moves in the manner of a "shoe shine."

I claim:

1. A method of operating a disk drive that includes a disk comprising a data track comprising a plurality of data sectors, the method comprising the steps of:
   providing a firmware-controlled state machine which can be in any of a plurality of states including an active state and an off-line in-progress state;
   while the state machine is in the active state, writing user data in response to a host command to a selected data sector of the data track;
   while the state machine is in the off-line in progress state, performing a firmware-controlled scan of the plurality of data sectors;
   while performing the firmware-controlled scan:
   identifying a marginal data sector of the data track;
   executing a plurality of data-recovery firmware procedures including a first data-recovery firmware procedure and a second data-recovery firmware procedure;
   performing a write-verify procedure on the marginal data sector if the first data-recovery firmware procedure is successful in recovering data from the marginal data sector;
   relocating the marginal data sector if the write-verify procedure fails; and
   inhibiting relocation of the marginal data sector if the second data-recovery firmware procedure is successful in recovering data from the marginal data sector.

2. The method of operating a disk drive as recited in claim 1, wherein the first data-recovery firmware procedure comprises a burst error correction code (ECC) firmware procedure.

3. A disk drive comprising:
   a disk comprising a data track comprising a plurality of data sectors; and
   a firmware-controlled state machine which can be in any of a plurality of states including an active state and an off-line in-progress state, wherein:
   while the state machine is in the active state, user data is written in response to a host command to a selected data sector of the data track;
   while the state machine is in the off-line in progress state, a firmware-controlled scan of the plurality of data sectors is performed;
   while performing the firmware-controlled scan:
   a marginal data sector of the data track is identified;
   a plurality of data-recovery firmware procedures are executed including a first data-recovery firmware procedure and a second data-recovery firmware procedure;
   a write-verify procedure is executed if the first data-recovery firmware procedure is successful in recovering data from the marginal data sector;

the marginal data sector is relocated if the write-verify procedure fails; and the marginal data sector is not relocated if the second data-recovery firmware procedure is successful in recovering data from the marginal data sector.

4. The disk drive as recited in claim 3, wherein the first data-recovery firmware procedure comprises a burst error correction code (ECC) firmware procedure.

* * * * *